(No Model.)

A. B. VAN CAMPEN.
SAW HANDLE.

No. 518,656.  Patented Apr. 24, 1894.

WITNESSES:

INVENTOR
A. B. Van Campen
BY
Munn & Co
ATTORNEYS.

UNITED STATES PATENT OFFICE.

AZEIL BARNES VAN CAMPEN, OF RAYMOND, CALIFORNIA.

SAW-HANDLE.

SPECIFICATION forming part of Letters Patent No. 518,656, dated April 24, 1894.

Application filed June 12, 1893. Serial No. 477,315. (No model.)

*To all whom it may concern:*

Be it known that I, AZEIL BARNES VAN CAMPEN, of Raymond, in the county of Fresno and State of California, have invented a new and Improved Saw-Handle, of which the following is a specification, reference being had to the annexed drawings, forming a part thereof, in which—

Figure 1:
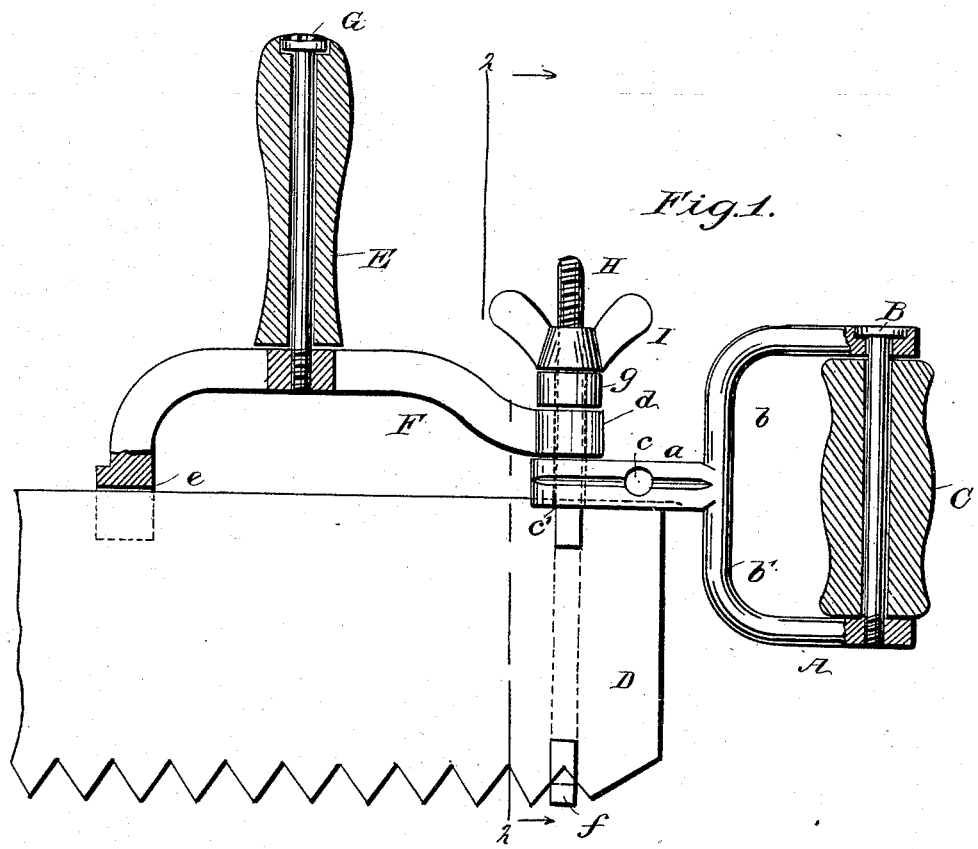
Figure 2:
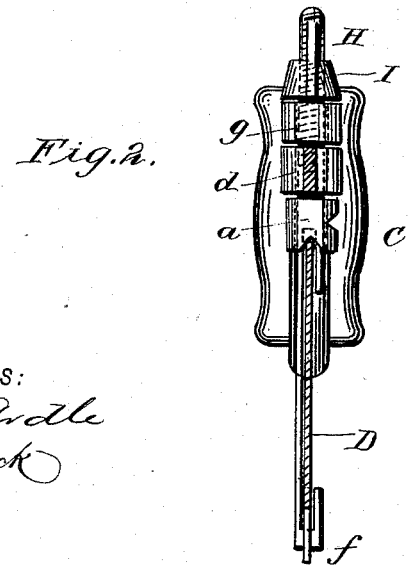

Figure 1 is a side sectional elevation of my improved saw handle; and Fig. 2 is a transverse section taken on line 2—2 in Fig. 1.

Similar letters of reference indicate corresponding parts in both the views.

The object of my invention is to provide a simple and effective adjustable handle for long saws such as are used for cutting up logs and timbers which may be applied to any saw of this class, and which will facilitate the operation of sawing by permitting greater freedom of movement of the hands.

My invention consists in the combination of a revoluble handle for the end of the saw, a handle for the back of the saw, and a hooked bolt for clamping the two handles to the saw, all as will be hereinafter more fully described.

The handle A, which is designed for the heel of the saw, is provided with a shank $a$ of rectangular cross section, the angled arms $b$ $b'$ formed integrally with the shank, and a tap bolt B passing through the arm $b$ near the end thereof, and into a threaded hole in the arm $b'$. On the tap bolt B, is loosely placed the handle C, of wood or other suitable material which turns freely upon the tap bolt B. The shank $a$ is grooved longitudinally upon two of its sides, and is perforated with holes $c$ $c'$, which are at right angles to each other. The shank $a$ is clamped to the back of the saw D, with the back edge resting in the groove in the shank.

The handle E, which is applied to the back of the saw is supported by a curved arm F, having at one end an eye $d$, and at the opposite end a slot $e$, which embraces the saw. In the arm F is inserted a tap bolt G, upon which the handle E is placed so as to turn freely. The bolt H, is provided with a hook $f$ which engages the cutting edge of the saw, while the threaded end of the bolt passes through one of the transverse holes in the shank $a$, and also through the eye $d$ of the arm F. The said bolt H is provided with a wing nut I, which bears upon a washer $g$ resting on the eye $d$ of the arm F, and the said nut serves to clamp the two parts of the saw handle firmly in place upon the saw. When grasping the handles E, C, and moving the saw in the usual way, the said handles turn on the tap bolts and thus relieve the hand of the friction commonly experienced in using saws of this class. The handle C may be arranged in the plane of the saw D, or at right angles thereto, according to the requirements of the work to be done.

Having thus described my invention, I claim as new and desire to secure by Letters Patent—

The combination, of a holder for the heel of a saw, provided with a longitudinally grooved and perforated shank $a$ having arms $b$ $b'$, the tap bolt B, the handle C loosely fitted to the tap bolt, the arm F provided with the eye $d$ and slotted end $e$, the tap bolt G inserted in the arm F, the handle E loosely fitted to the tap bolt G, and the hooked bolt H provided with the wing nut I, substantially as specified.

AZEIL BARNES VAN CAMPEN.

Witnesses:
CHAS. H. MURPHY,
JAMES W. COOP.